US012772040B2

(12) United States Patent
Yuan

(10) Patent No.: US 12,772,040 B2
(45) Date of Patent: Oct. 20, 2026

(54) DATA SUBSCRIPTION METHOD AND APPARATUS, AND NETWORK ELEMENT

(71) Applicant: VIVO MOBILE COMMUNICATION CO., LTD., Guangdong (CN)

(72) Inventor: Yannan Yuan, Guangdong (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 277 days.

(21) Appl. No.: 18/621,530

(22) Filed: Mar. 29, 2024

(65) Prior Publication Data

US 2024/0244419 A1 Jul. 18, 2024

Related U.S. Application Data

(63) Continuation of application No. PCT/CN2022/120899, filed on Sep. 23, 2022.

(30) Foreign Application Priority Data

Sep. 30, 2021 (CN) .......................... 202111162870.5

(51) Int. Cl.
*H04W 8/20* (2009.01)
*H04W 24/10* (2009.01)

(52) U.S. Cl.
CPC ............. *H04W 8/20* (2013.01); *H04W 24/10* (2013.01)

(58) Field of Classification Search
CPC ....... A61K 45/06; A61P 35/00; C07D 487/04; H04W 24/10; H04W 8/20
See application file for complete search history.

(56) References Cited

U.S. PATENT DOCUMENTS

| | | | | |
|---|---|---|---|---|
| 2020/0059407 | A1* | 2/2020 | Lu | H04L 41/0631 |
| 2020/0252813 | A1* | 8/2020 | Li | G06Q 20/382 |
| 2020/0322821 | A1 | 10/2020 | Lee et al. | |
| 2022/0116811 | A1* | 4/2022 | Li | H04L 43/06 |
| 2022/0174477 | A1* | 6/2022 | Xiong | H04W 24/02 |

FOREIGN PATENT DOCUMENTS

| | | | |
|---|---|---|---|
| CN | 112188533 | A | 1/2021 |
| KR | 101811686 | B1 | 12/2017 |
| WO | 2021128089 | A1 | 7/2021 |
| WO | 2021156771 | A1 | 8/2021 |
| WO | 2021184783 | A1 | 9/2021 |

OTHER PUBLICATIONS

Garcia-Luna-Aceves et al, "CORD: Content Oriented Routing with Directories", 2015 International Conference on Computing, Networking and Communications (ICNC), IEEE, Feb. 16, 2015.
Huawei, Hisilicon, "Clarification on support of PTP GM function in TT", 3GPP TSG-WG SA2 Meeting #145E e-meeting, S2-2105090, Elbonia, May 17-28, 2021 (revision of S2-2104188).
Third Office Action dated Jan. 30, 2026 received in corresponding patent family application No. CN202111162870.5. English translation attached.

* cited by examiner

*Primary Examiner* — Amy R Hsu

(57) ABSTRACT

This application discloses a data subscription method and apparatus, and a network element. The data subscription method in embodiments of this application includes: obtaining, by a first data plane function, data service configuration information and/or data service request information; and sending, by the first data plane function, a data subscription request message to a data providing function according to the data service configuration information and/or the data service request information.

19 Claims, 5 Drawing Sheets

DATA SUBSCRIPTION METHOD AND APPARATUS, AND NETWORK ELEMENT

CROSS-REFERENCE TO RELATED APPLICATIONS

This application is a Bypass continuation application of PCT International Application No. PCT/CN2022/120899 filed on Sep. 23, 2022, which claims priority to Chinese patent application Ser. No. 20/2111162870.5, filed in China on Sep. 30, 2021, which are incorporated herein by reference in their entireties.

TECHNICAL FIELD

This application pertains to the field of communication technologies, and specifically relates to a data subscription method and apparatus, and a network element.

BACKGROUND

A network data analytics function (NWDAF) is one of network functions of a 5th generation (5G) core network control plane, and the function is limited to a subscription event provided by a network function of the 5G core network control plane, and does not support data collection of a core network user plane, a radio access network, and user equipment (UE). In addition, an existing network does not support real-time data subscription and service. On the one hand, interface performance and a function design do not support real-time data subscription and service. On the other hand, a network element device does not consider this part of overheads because a data service related function is not standardized. As a result, a large amount of real-time data reporting affects network performance.

SUMMARY

Embodiments of this application provide a data subscription method and apparatus, and a network element.

According to a first aspect, a data subscription method is provided, including:

obtaining, by a first data plane function, data service configuration information and/or data service request information; and sending, by the first data plane function, a data subscription request message to a data providing function according to the data service configuration information and/or the data service request information.

According to a second aspect, a data subscription method is provided, including:

receiving, by a data providing function, a data subscription request message sent by a first data plane function according to data service configuration information and/or data service request information.

According to a third aspect, a data subscription method is provided, including:

receiving, by a receiver of data report, subscription configuration information sent by a first data plane function, where the subscription configuration information is used to indicate related information of a data report that the receiver of data report needs to receive.

According to a fourth aspect, a data subscription apparatus is provided, applied to a first data plane function and including:

a first obtaining module, configured to obtain data service configuration information and/or data service request information; and a first sending module, configured to send a data subscription request message to a data providing function according to the data service configuration information and/or the data service request information.

According to a fifth aspect, a network element having a first data plane function is provided. The network element includes a processor, a memory, and a program or an instruction that is stored in the memory and that can be run on the processor, and the program or the instruction is executed by the processor to implement the steps of the method according to the first aspect.

According to a sixth aspect, a data subscription apparatus is provided, applied to a data providing function and including:

a second receiving module, configured to receive a data subscription request message sent by a first data plane function according to data service configuration information and/or data service request information.

According to a seventh aspect, a network element having a data providing function is provided. The network element includes a processor, a memory, and a program or an instruction that is stored in the memory and that can be run on the processor, and the program or the instruction is executed by the processor to implement the steps of the method according to the second aspect.

According to an eighth aspect, a data subscription apparatus is provided, applied to a receiver of data report and including:

a third receiving module, configured to receive subscription configuration information sent by a first data plane function, where the subscription configuration information is used to indicate related information of a data report that the receiver of data report needs to receive.

According to a ninth aspect, a network element corresponding to a receiver of data report is provided. The network element includes a processor, a memory, and a program or an instruction that is stored in the memory and that can be run on the processor, and the program or the instruction is executed by the processor to implement the steps of the method according to the third aspect.

According to a tenth aspect, a network element having a first data plane function is provided, including a processor and a communication interface. The communication interface is configured to obtain data service configuration information and/or data service request information; and the processor is configured to send a data subscription request message to a data providing function according to the data service configuration information and/or the data service request information.

According to an eleventh aspect, a network element having a data providing function is provided, including a processor and a communication interface. The communication interface is configured to receive a data subscription request message sent by a first data plane function according to data service configuration information and/or data service request information.

According to a twelfth aspect, a network element corresponding to a receiver of data report is provided, including a processor and a communication interface. The communication interface is configured to receive subscription configuration information sent by a first data plane function, where the subscription configuration information is used to indicate related information of a data report that the receiver of data report needs to receive.

According to a thirteenth aspect, a readable storage medium is provided. A program or an instruction is stored on the readable storage medium, and the program or the instruction is executed by a processor to implement the steps of the method according to the first aspect, the steps of the method according to the second aspect, or the steps of the method according to the third aspect.

According to a fourteenth aspect, a chip is provided. The chip includes a processor and a communication interface, the communication interface is coupled to the processor, and the processor is configured to run a program or an instruction to implement the method according to the first aspect, the method according to the second aspect, or the method according to the third aspect.

According to a fifteenth aspect, a computer program/program product is provided. The computer program/program product is stored in a non-transient storage medium, and the computer program/program product is executed by at least one processor to implement the steps of the method according to the first aspect, the steps of the method according to the second aspect, or the steps of the method according to the third aspect.

According to a sixteenth aspect, a network element is provided, configured to perform the steps of the method according to the first aspect, the second aspect, or the third aspect.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill based on the embodiments of this application shall fall within the protection scope of this application.

In the specification and claims of this application, the terms "first", "second", and the like are intended to distinguish between similar objects but do not describe a specific order or sequence. It should be understood that the terms used in such a way are interchangeable in proper circumstances so that the embodiments of this application can be implemented in orders other than the order illustrated or described herein. Objects classified by "first" and "second" are usually of a same type, and the number of objects is not limited. For example, there may be one or more first objects. In addition, in the specification and claims, "and/or" represents at least one of connected objects, and a character "/" generally represents an "or" relationship between associated objects.

It should be noted that technologies described in the embodiments of this application are not limited to a Long Time Evolution (LTE)/LTE-Advanced (LTE-A) system, and may further be applied to other wireless communication systems such as Code Division Multiple Access (CDMA), Time Division Multiple Access (TDMA), Frequency Division Multiple Access (FDMA), Orthogonal Frequency Division Multiple Access (OFDMA), single-carrier frequency division multiple access (SC-FD-MA), and other systems. The terms "system" and "network" in the embodiments of this application may be used interchangeably. The technologies described can be applied to both the systems and the radio technologies mentioned above as well as to other systems and radio technologies. The following describes a New Radio (NR) system for example purposes, and NR terms are used in most of the following descriptions. These technologies can also be applied to applications other than an NR system application, such as a 6th generation (6G) communication system.

Figure 1:
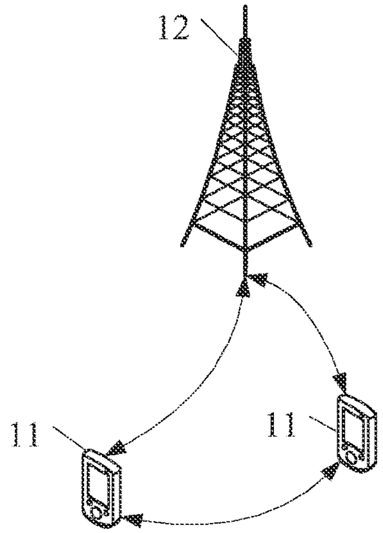
FIG. 1 is a block diagram of a wireless communication system to which the embodiments of this application can be applied.

FIG. 1 is a block diagram of a wireless communication system to which the embodiments of this application can be applied. The wireless communication system includes a terminal 11 and a network side device 12. The terminal 11 maybe a terminal side device such as a mobile phone, a tablet personal computer, a laptop computer or a notebook computer, a personal digital assistant (PDA), a palm computer, a netbook, an ultra-mobile personal computer (UMPC), a mobile internet device (MID), an augmented reality (AR)/virtual reality (VR) device, a robot, a wearable device, vehicle user equipment (VUE), pedestrian user equipment (PUE), a smart household (a household device with a wireless communication function, such as a refrigerator, a television, a washing machine, or furniture), and the wearable device includes a smart watch, a smart band, a smart headset, smart glasses, smart jewelry (a smart bangle, a smart bracelet, a smart ring, a smart necklace, a smart anklet, and a smart chain), a smart wrist strap, a smart dress, a game console, and the like. The network side device 12 may be a base station or a core network. The base station may be referred to as an access point, a base transceiver station (BTS), a radio base station, a radio transceiver, a basic service set (BSS), an extended service set (ESS), a NodeB, an evolved NodeB (eNB), a home NodeB, a home evolved NodeB, a wireless local area network (WLAN) access point, a wireless fidelity (Wi-Fi) node, a transmitting receiving point (TRP), or another appropriate term in the art. As long as a same technical effect is achieved, the base station is not limited to a specified technical term. It should be noted that, in the embodiments of this application, only a base station in an NR system is used as an example, but a specific type of the base station is not limited.

With reference to the accompanying drawings, the following describes in detail the data subscription method provided in the embodiments of this application by using some embodiments and application scenes thereof.

It should be noted that a network function provided in the embodiments of this application includes but is not limited to at least one of a first function, a second function, a third function, a core network control plane function, a core network user plane function, an application function, a radio access network user plane function, and a radio access network control plane function, and all have respective corresponding network elements, nodes, units, or modules. This is not specifically limited herein.

Figure 2:
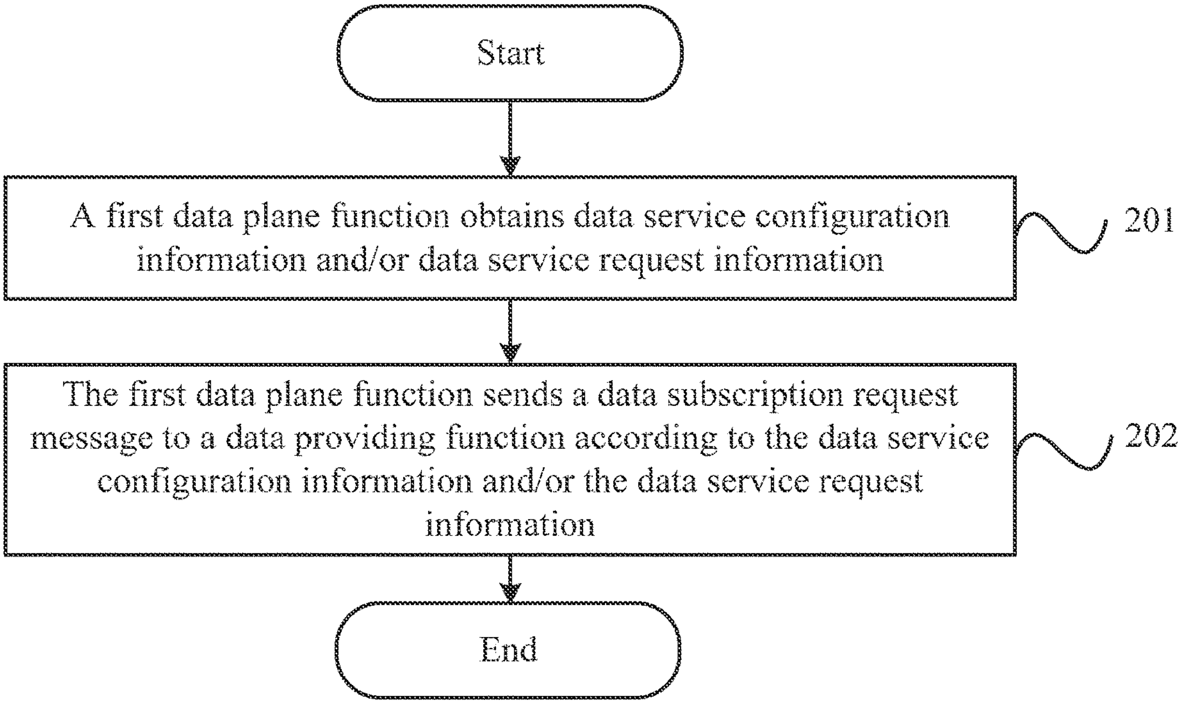
FIG. 2 is a first flowchart of steps of a data subscription method according to an embodiment of this application.

As shown in FIG. 2, an embodiment of this application provides a data subscription method, including:

Step 201: A first data plane function obtains data service configuration information and/or data service request information.

Step 202: The first data plane function sends a data subscription request message to a data providing function according to the data service configuration information and/or the data service request information.

In at least one optional embodiment of this application, the first data plane function includes at least one of the following:

a first function of a core network data plane, where the first function is a network function of a core network and is responsible for an end-to-end data service; and optionally, the first function implements a data service by interacting with at least one of a core network control plane function, a core network user plane function, an application function, a radio access network user plane function, a radio access network control plane function, UE, a second function, and a third function;

a second function of a radio access network data plane, where the second function is responsible for data collection and/or a data service of a radio access network; and optionally, the second function implements a data service by interacting with at least one of a radio access network control plane function, a radio access network user plane function, an application function, UE, a first function, and a third function; or a third function of a terminal side data plane, where the third function serves data collection and/or a data service of a terminal; and optionally, the third function implements a data service by interacting with at least one of a first function, a second function, and an application function.

Optionally, the first function is one of network functions of the core network, and may also be referred to as a core network data plane function. The second function is one of network functions of the radio access network, and may also be referred to as a radio access network data plane function. The third function is one of functions on the UE side, and may also be referred to as a UE side data plane function.

In at least one optional embodiment of this application, the data providing function includes at least one of a core network control plane function, a core network user plane function, an application function (AF), a radio access network user plane function, a radio access network control plane function, a radio access network function, a UE-side terminal, a first function, a second function, and a third function. This is not specifically limited herein.

To support intelligence, communication and sensing fusion, digital twin, and the like, an intelligent function, a sensing function, and a digital twin function send a data request to the first data plane function, and then the data subscription method includes the first data plane function, the data providing function, and a receiver of data report (which may also be referred to as a data consumption function). Optionally, the first data plane function includes at least the first function. Optionally, the first data plane function further includes the second function and/or the third function.

In at least one optional embodiment of this application, the data subscription request message includes at least one of the following:

a message type, used to indicate that the message is a subscription request message;

a subscription type, where the subscription type includes at least one of the following: terminal-oriented subscription; network function-oriented subscription; and service-oriented subscription;

identifier information of the data subscription request message, for example, a request identifier (ID), mainly used by a data subscription sender to maintain the data subscription request message, where the first function, the second function, and the third function may separately maintain respective request IDs, or the first function and the second function may jointly maintain request IDs, or the first function uniformly maintain request IDs;

identifier information of the data providing function, used to identify the data providing function, for example, a globally unique access and mobility management function (AMF) ID (GUAMI), a base station identifier (gNB ID), an access point name (APN), or a data network name (DNN), where it should be noted that the gNB may be an NR node or a 5G base station; or subscription parameter information.

Optionally, the subscription parameter information includes at least one of the following:

list information of a subscription parameter, where the list information of the subscription parameter may be represented by a character type, or may be represented by an identifier of a predefined parameter/parameter list;

a sampling rate of a subscription parameter, that is, how often a sampling point is generated; or trigger condition information of a subscription parameter, where for example, the trigger condition may be arbitrary (once accepted, a subscribed parameter needs to be reported in any case within a time before modification or deletion), or a valid time, or a character type or a predefined trigger condition, for example, a physical resource block (PRB) utilization is greater than 50%, or a UE handover success rate is less than 90%.

In an optional embodiment, the data subscription request message further includes at least one of the following:

indication information of a receiver of data report, where the indication information is used to explicitly indicate the receiver of data report; and for example, the receiver of data report is identified by using a first function ID, and in another indication manner, the receiver of data report is indicated in a manner of a transport layer address and a port number (port);

indication information of a transmission path of data report, where the indication information is used to explicitly indicate the transmission path of data report; and for example, a second function ID (one or more nodes may be specified on the transmission path) indicates that the transmission path is the data providing function→the second function→the first function, and in another indication manner, the transmission path of data report is indicated in a manner of a transport layer address and a port number (port); or indication information of a reporting manner of a data report, where, for example, the reporting manner includes one or more of performing reporting at a time period, performing reporting at a length, and performing reporting at a fastest reporting frequency of a data provider.

In another optional embodiment, the data subscription request message is used to implicitly indicate that a receiver of data report is the same as a sender of the data subscription request message;

and/or the data subscription request message is used to implicitly indicate that a transmission path of data report is the same as a transmission path of the data subscription request message.

Optionally, if the data subscription request message does not carry information indicating the receiver of data report or the transmission path of data report, the data subscription request message implicitly indicates that the receiver of data report is the same as the sender of the data subscription request message, or that the transmission path of data report is the same as the transmission path of the data subscription request message.

In still another optional embodiment, a receiver of data report is indirectly indicated by using at least one piece of information included in the data subscription request message, where, for example, the receiver of data report is indirectly indicated based on a parameter such as a subscription type or subscription parameter information;

and/or a transmission path of data report is indirectly indicated by using at least one piece of information included in the data subscription request message, where, for example, the transmission path of data report is indirectly indicated based on a parameter such as a subscription type or subscription parameter information;

and/or a reporting manner of a data report is indirectly indicated by using at least one piece of information included in the data subscription request message, where, for example, a data reporting manner is in a one-to-one correspondence with a receiver of data report, and in a potential solution, the first function of the core network performs periodic reporting, and the second function of the radio access network performs reporting at a fastest frequency supported by a data provider; or the reporting manner is determined based on parameters such as a subscription request sender, a subscription type, a subscription parameter, and a receiver of data report by using a preset parameter.

The reporting manner includes one or more of performing reporting at a time period, performing reporting at a length, and performing reporting at a fastest reporting frequency of a data provider.

Optionally, in this scene, a network element needs to preconfigure a correspondence between the parameter such as the subscription type or the subscription parameter information and the receiver of data report or the transmission path of data report or the reporting manner.

In at least one optional embodiment of this application, the method further includes:

receiving, by the first data plane function, a data subscription response message or a data subscription failure message sent by the data providing function, where the data subscription response message is used to indicate that the data providing function accepts some or all subscription parameters; and the data subscription failure message is used to indicate that the data providing function denies all subscription parameters.

Optionally, the data subscription response message includes at least one of the following:

a message type, used to indicate that the message is a subscription response message;

a subscription type, where the subscription type includes at least one of the following: terminal-oriented subscription; network function-oriented subscription; and service-oriented subscription;

identifier information of the data subscription request message, for example, a request ID, mainly used by a data subscription sender to maintain the data subscription request message, where the first function, the second function, and the third function may separately maintain respective request IDs, or the first function and the second function may jointly maintain request IDs, or the first function uniformly maintain request IDs;

identifier information of the data providing function, used to identify the data providing function, for example, a globally unique AMF ID (GUAMI), a base station identifier (gNB ID), an access point name APN, or a data network name DNN; or accepted subscription parameter information, where if all accepted, the information may be represented by a specific character or list parameter identifier.

Optionally, the subscription parameter information includes at least one of the following:

list information of a subscription parameter, where the list information of the subscription parameter may be represented by a character type, or may be represented by an identifier of a predefined parameter/parameter list;

a sampling rate of a subscription parameter, that is, how often a sampling point is generated; or trigger condition information of a subscription parameter, where for example, the trigger condition may be arbitrary (once accepted, a subscribed parameter needs to be reported in any case within a time before modification or deletion), or a valid time, or a character type or a predefined trigger condition, for example, a physical resource block (PRB) utilization is greater than 50%, or a UE handover success rate is less than 90%.

Optionally, the data subscription failure message includes at least one of the following:

a message type, used to indicate that the message is a subscription failure message;

a subscription type, where the subscription type includes at least one of the following: terminal-oriented subscription; network function-oriented subscription; and service-oriented subscription;

identifier information of the data subscription request message, for example, a request ID, mainly used by a data subscription sender to maintain the data subscription request message, where the first function, the second function, and the third function may separately maintain respective request IDs, or the first function and the second function may jointly maintain request IDs, or the first function uniformly maintain request IDs;

identifier information of the data providing function, used to identify the data providing function, for example, a globally unique AMF ID (GUAMI), a base station identifier (gNB ID), an access point name APN, or a data network name DNN; or a denial cause.

In at least one optional embodiment of this application, if a data subscription requester (the first data plane function in this embodiment) is different from the receiver of data report, after the receiving, by the first data plane function, a data subscription response message, the method further includes:

separately sending, by the first data plane function, subscription configuration information to at least one receiver of data report, where the subscription configuration information is used to indicate related information of a data report that the receiver of data report needs to receive. Correspondingly, the receiver of data report that receives the subscription configuration information receives the corresponding data report according to the subscription configuration information.

The subscription configuration information includes at least one of the following:

a subscription type, where the subscription type includes at least one of the following: terminal-oriented subscription; network function-oriented subscription; and service-oriented subscription;

a subscription identifier of a data report, which is consistent with identifier information of the data subscription request message, and is used by the data providing function and the receiver of data report to identify the configured data report;

identifier information of the data providing function, used to identify the data providing function, for example, a globally unique AMF ID (GUAMI), a base station identifier (gNB ID), an access point name APN, or a data network name DNN;

subscription parameter information; or indication information of a reporting manner of a data report, where, for example, the reporting manner includes one or more of performing reporting at a time period, performing reporting at a length, and performing reporting at a fastest reporting frequency of a data provider.

Optionally, the subscription parameter information includes at least one of the following:

list information of a subscription parameter, where the list information of the subscription parameter may be represented by a character type, or may be represented by an identifier of a predefined parameter/parameter list;

a sampling rate of a subscription parameter, that is, how often a sampling point is generated; or trigger condition information of a subscription parameter, where for example, the trigger condition may be arbitrary (once accepted, a subscribed parameter needs to be reported in any case within a time before modification or deletion), or a valid time, or a character type or a predefined trigger condition, for example, a physical resource block (PRB) utilization is greater than 50%, or a UE handover success rate is less than 90%.

In a case that there is more than one receiver of data report, and data reports accepted by different receivers of data report are the same or reported parameters overlap a lot, the subscription configuration information further includes:

indication information of data report processing used to indicate a manner of processing a data report by the receiver of data report, where the processing manner includes: transparently forwarding the data report, and/or locally processing the data report.

In this embodiment of this application, the first data plane function sends the data subscription request message to the data providing function according to the data service configuration information and/or the data service request information, to implement real-time data subscription. In addition, data subscriptions and a data report to a required target object can be resolved through explicit or implicit indication of the data subscription request message, thereby reducing signaling overheads and avoiding repeated data transmission. In this embodiment of this application, centralized control of a function (that is, a first function) of a core network data plane is supported, that is, data subscription is uniformly managed by the first function, and another data plane function is responsible for receiving and processing a data report. In addition, hierarchical control of data plane functions of a core network, a radio access network, and UE is supported, that is, a data subscription function is jointly managed by the first function, a second function, and/or a third function. For a case in which a plurality of nodes need same data subscription information, signaling overheads are reduced and repeated data transmission is avoided through indication of a data receiver and indication of a transmission path.

Figure 3:
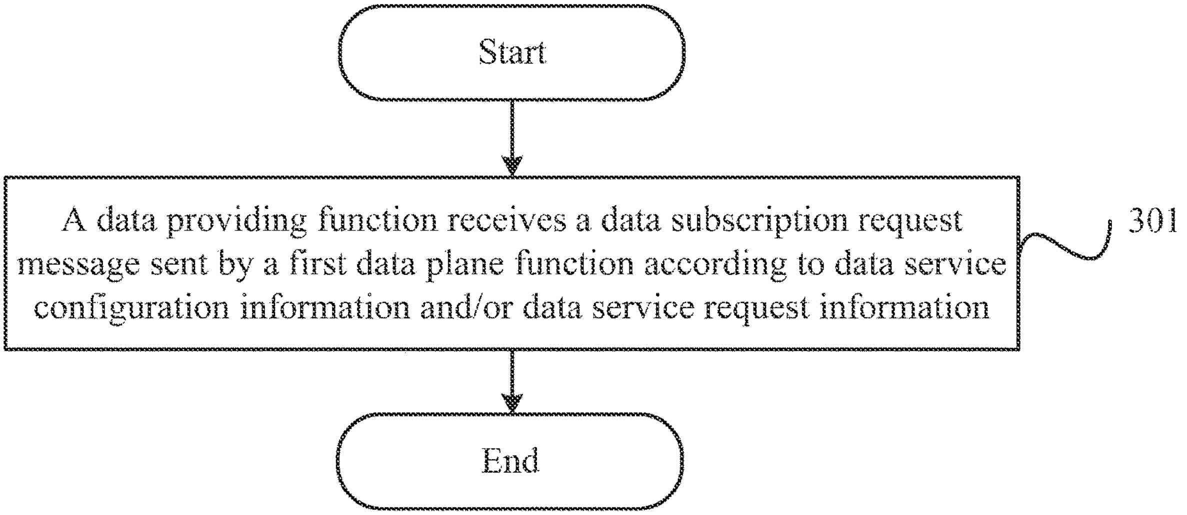
FIG. 3 is a second flowchart of steps of a data subscription method according to an embodiment of this application.

As shown in FIG. 3, an embodiment of this application further provides a data subscription method, including:

Step 301: A data providing function receives a data subscription request message sent by a first data plane function according to data service configuration information and/or data service request information.

In at least one optional embodiment of this application, the first data plane function includes at least one of the following:

a first function of a core network data plane, where the first function is a network function of a core network and is responsible for an end-to-end data service; and optionally, the first function implements a data service by interacting with at least one of a core network control plane function, a core network user plane function, an application function, a radio access network user plane function, a radio access network control plane function, UE, a second function, and a third function;

a second function of a radio access network data plane, where the second function is responsible for data collection and/or a data service of a radio access network; and optionally, the second function implements a data service by interacting with at least one of a radio access network control plane function, a radio access network user plane function, an application function, UE, a first function, and a third function; or a third function of a terminal side data plane, where the third function serves data collection and/or a data service of a terminal; and optionally, the third function implements a data service by interacting with at least one of a first function, a second function, and an application function.

Optionally, the first function is one of network functions of the core network, and may also be referred to as a core network data plane function. The second function is one of network functions of the radio access network, and may also be referred to as a radio access network data plane function. The third function is one of functions on the UE side, and may also be referred to as a UE side data plane function.

In at least one optional embodiment of this application, the data providing function includes at least one of a core network control plane function, a core network user plane function, an application function AF, a radio access network user plane function, a radio access network control plane function, a radio access network function, a UE-side terminal, a first function, a second function, and a third function. This is not specifically limited herein.

To support intelligence, communication and sensing fusion, digital twin, and the like, the data subscription method includes the first data plane function, the data providing function, and a receiver of data report (which may also be referred to as a data consumption function). Optionally, the first data plane function includes at least the first function. Optionally, the first data plane function further includes the second function and/or the third function.

In at least one optional embodiment of this application, the data subscription request message includes at least one of the following:

- a message type, used to indicate that the message is a subscription request message;
- a subscription type, where the subscription type includes at least one of the following: terminal-oriented subscription; network function-oriented subscription; and service-oriented subscription;
- identifier information of the data subscription request message, for example, a request ID, mainly used by a data subscription sender to maintain the data subscription request message, where the first function, the second function, and the third function may separately maintain respective request IDs, or the first function and the second function may jointly maintain request IDs, or the first function uniformly maintain request IDs;
- identifier information of the data providing function, used to identify the data providing function, for example, a globally unique AMF ID (GUAMI), a base station identifier (gNB ID), an access point name APN, or a data network name DNN; or
- subscription parameter information.

Optionally, the subscription parameter information includes at least one of the following:

- list information of a subscription parameter, where the list information of the subscription parameter may be represented by a character type, or may be represented by an identifier of a predefined parameter/parameter list;
- a sampling rate of a subscription parameter, that is, how often a sampling point is generated; or
- trigger condition information of a subscription parameter, where for example, the trigger condition may be arbitrary (once accepted, a subscribed parameter needs to be reported in any case within a time before modification or deletion), or a valid time, or a character type or a predefined trigger condition, for example, a physical resource block (PRB) utilization is greater than 50%, or a UE handover success rate is less than 90%.

In an optional embodiment, the data subscription request message further includes at least one of the following:

- indication information of a receiver of data report, where the indication information is used to explicitly indicate the receiver of data report; and for example, the receiver of data report is identified by using a first function ID, and in another indication manner, the receiver of data report is indicated in a manner of a transport layer address and a port number (port);
- indication information of a transmission path of data report, where the indication information is used to explicitly indicate the transmission path of data report; and for example, a second function ID (one or more nodes may be specified on the transmission path) indicates that the transmission path is the data providing function→the second function→the first function, and in another indication manner, the transmission path of data report is indicated in a manner of a transport layer address and a port number (port); or
- indication information of a reporting manner of a data report, where, for example, the reporting manner includes one or more of performing reporting at a time period, performing reporting at a length, and performing reporting at a fastest reporting frequency of a data provider.

In another optional embodiment, the data subscription request message is used to implicitly indicate that a receiver of data report is the same as a sender of the data subscription request message;

and/or the data subscription request message is used to implicitly indicate that a transmission path of data report is the same as a transmission path of the data subscription request message.

Optionally, if the data subscription request message does not carry information indicating the receiver of data report or the transmission path of data report, the data subscription request message implicitly indicates that the receiver of data report is the same as the sender of the data subscription request message, or that the transmission path of data report is the same as the transmission path of the data subscription request message.

In still another optional embodiment, a receiver of data report is indirectly indicated by using at least one piece of information included in the data subscription request message, where, for example, the receiver of data report is indirectly indicated based on a parameter such as a subscription type or subscription parameter information;

and/or a transmission path of data report is indirectly indicated by using at least one piece of information included in the data subscription request message, where, for example, the transmission path of data report is indirectly indicated based on a parameter such as a subscription type or subscription parameter information;

and/or a reporting manner of a data report is indirectly indicated by using at least one piece of information included in the data subscription request message, where, for example, a data reporting manner is in a one-to-one correspondence with a receiver of data report, and in a potential solution, the first function of the core network performs periodic reporting, and the second function of the radio access network performs reporting at a fastest frequency supported by a data provider; or the reporting manner is determined based on parameters such as a subscription request sender, a subscription type, a subscription parameter, and a receiver of data report by using a preset parameter.

For example, the reporting manner includes one or more of performing reporting at a time period, performing reporting at a length, and performing reporting at a fastest reporting frequency of a data provider.

Optionally, in this scene, a network element needs to preconfigure a correspondence between the parameter such as the subscription type or the subscription parameter information and the receiver of data report or the transmission path of data report.

In at least one optional embodiment of this application, the method further includes:

sending, by the data providing function, a data subscription response message or a data subscription failure message to the first data plane function, where the data subscription response message is used to indicate that the data providing function accepts some or all subscription parameters; and the data subscription failure message is used to indicate that the data providing function denies all subscription parameters.

Optionally, the data subscription response message includes at least one of the following:

a message type, used to indicate that the message is a subscription response message;

a subscription type, where the subscription type includes at least one of the following: terminal-oriented subscription; network function-oriented subscription; and service-oriented subscription;

identifier information of the data subscription request message, for example, a request ID, mainly used by a data subscription sender to maintain the data subscription request message, where the first function, the second function, and the third function may separately maintain respective request IDs, or the first function and the second function may jointly maintain request IDs, or the first function uniformly maintain request IDs;

identifier information of the data providing function, used to identify the data providing function, for example, a globally unique AMF ID (GUAMI), a base station identifier (gNB ID), an access point name APN, or a data network name DNN; or accepted subscription parameter information, where if all accepted, the information may be represented by a specific character or list parameter identifier.

Optionally, the subscription parameter information includes at least one of the following:

list information of a subscription parameter, where the list information of the subscription parameter may be represented by a character type, or may be represented by an identifier of a predefined parameter/parameter list;

a sampling rate of a subscription parameter, that is, how often a sampling point is generated; or trigger condition information of a subscription parameter, where for example, the trigger condition may be arbitrary (once accepted, a subscribed parameter needs to be reported in any case within a time before modification or deletion), or a valid time, or a character type or a predefined trigger condition, for example, a physical resource block (PRB) utilization is greater than 50%, or a UE handover success rate is less than 90%.

Optionally, the data subscription failure message includes at least one of the following:

a message type, used to indicate that the message is a subscription failure message;

a subscription type, where the subscription type includes at least one of the following: terminal-oriented subscription; network function-oriented subscription; and service-oriented subscription;

identifier information of the data subscription request message, for example, a request ID, mainly used by a data subscription sender to maintain the data subscription request message, where the first function, the second function, and the third function may separately maintain respective request IDs, or the first function and the second function may jointly maintain request IDs, or the first function uniformly maintain request IDs;

identifier information of the data providing function, used to identify the data providing function, for example, a globally unique AMF ID (GUAMI), a base station identifier (gNB ID), an access point name APN, or a data network name DNN; or a denial cause.

In at least one optional embodiment of this application, if a data subscription requester (the first data plane function in this embodiment) is different from the receiver of data report, after the sending, by the data providing function, a data subscription response message to the first data plane function, the method further includes:

determining, by the data providing function, at least one receiver of data report according to the data subscription request message; and sending, by the data providing function, a corresponding data report to the at least one receiver of data report.

In this embodiment of this application, the first data plane function sends the data subscription request message to the data providing function according to the data service configuration information and/or the data service request information, to implement real-time data subscription. In addition, data subscriptions and a data report to a required target object can be resolved through explicit or implicit indication of the data subscription request message, thereby reducing signaling overheads and avoiding repeated data transmission. In this embodiment of this application, centralized control of a function (that is, a first function) of a core network data plane is supported, that is, data subscription is uniformly managed by the first function, and another data plane function is responsible for receiving and processing a data report. In addition, hierarchical control of data plane functions of a core network, a radio access network, and UE is supported, that is, a data subscription function is jointly managed by the first function, a second function, and/or a third function. For a case in which a plurality of nodes need same data subscription information, signaling overheads are reduced and repeated data transmission is avoided through indication of a data receiver and indication of a transmission path.

Figure 4:
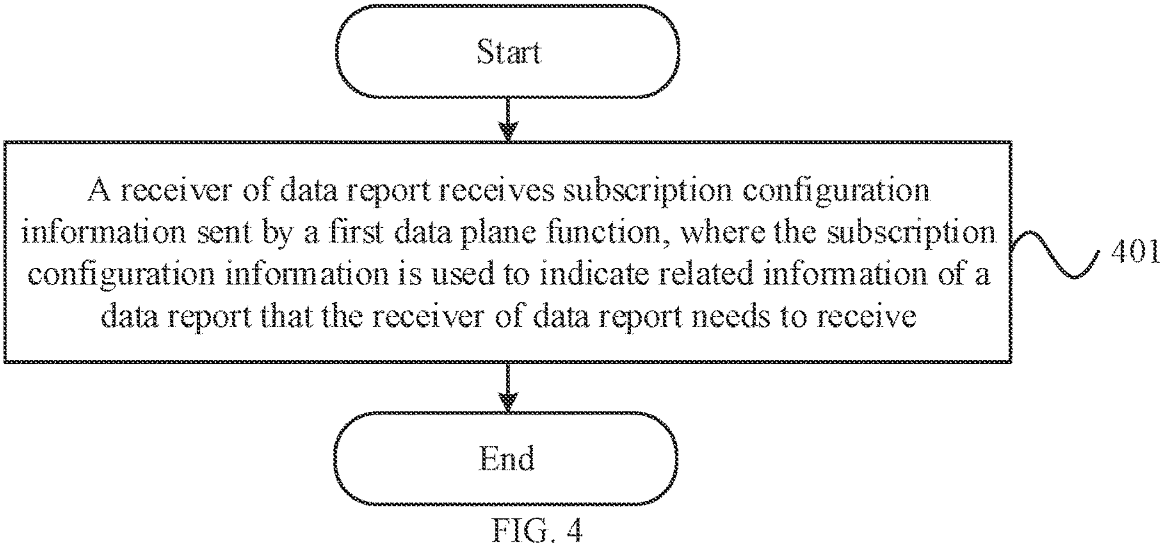
FIG. 4 is a third flowchart of steps of a data subscription method according to an embodiment of this application.

As shown in FIG. 4, an embodiment of this application further provides a data subscription method, including:

Step 401: A receiver of data report receives subscription configuration information sent by a first data plane function, where the subscription configuration information is used to indicate related information of a data report that the receiver of data report needs to receive.

In at least one optional embodiment of this application, if a data subscription requester (the first data plane function in this embodiment) is different from the receiver of data report, the first data plane function separately sends subscription configuration information to at least one receiver of data report, where the subscription configuration information is used to indicate related information of a data report that the receiver of data report needs to receive.

The subscription configuration information includes at least one of the following:

a subscription type, where the subscription type includes at least one of the following: terminal-oriented subscription; network function-oriented subscription; and service-oriented subscription;

a subscription identifier of a data report, which is consistent with identifier information of the data subscription request message, and is used by the data providing function and the receiver of data report to identify the configured data report;

identifier information of the data providing function, used to identify the data providing function, for example, a globally unique AMF ID (GUAMI), a base station identifier (gNB ID), an access point name APN, or a data network name DNN;

subscription parameter information; or indication information of a reporting manner of a data report, where, for example, the reporting manner includes one or more of performing reporting at a time period, performing reporting at a length, and performing reporting at a fastest reporting frequency of a data provider.

Optionally, the subscription parameter information includes at least one of the following:

list information of a subscription parameter, where the list information of the subscription parameter may be represented by a character type, or may be represented by an identifier of a predefined parameter/parameter list;

a sampling rate of a subscription parameter, that is, how often a sampling point is generated; or trigger condition information of a subscription parameter, where for example, the trigger condition may be arbitrary (once accepted, a subscribed parameter needs to be reported in any case within a time before modification or deletion), or a valid time, or a character type or a predefined trigger condition, for example, a physical resource block (PRB) utilization is greater than 50%, or a UE handover success rate is less than 90%.

In a case that there is more than one receiver of data report, and data reports accepted by different receivers of data report are the same or reported parameters overlap a lot, the subscription configuration information further includes:

indication information of data report processing used to indicate a manner of processing a data report by the receiver of data report, where the processing manner includes: transparently forwarding the data report, and/or locally processing the data report.

In an optional embodiment, the method further includes:

receiving, by the receiver of data report according to the subscription configuration information, a data report sent by a data providing function.

In at least one optional embodiment of this application, the first data plane function includes at least one of the following:

a first function of a core network data plane, where the first function is a network function of a core network and is responsible for an end-to-end data service; and optionally, the first function implements a data service by interacting with at least one of a core network control plane function, a core network user plane function, an application function, a radio access network user plane function, a radio access network control plane function, UE, a second function, and a third function;

a second function of a radio access network data plane, where the second function is responsible for data collection and/or a data service of a radio access network; and optionally, the second function implements a data service by interacting with at least one of a radio access network control plane function, a radio access network user plane function, an application function, UE, a first function, and a third function; or a third function of a terminal side data plane, where the third function serves data collection and/or a data service of a terminal; and optionally, the third function implements a data service by interacting with at least one of a first function, a second function, and an application function.

Optionally, the first function is one of network functions of the core network, and may also be referred to as a core network data plane function. The second function is one of network functions of the radio access network, and may also be referred to as a radio access network data plane function. The third function is one of functions on the UE side, and may also be referred to as a UE side data plane function.

In this embodiment of this application, the first data plane function sends the data subscription request message to the data providing function according to the data service configuration information and/or the data service request information, to implement real-time data subscription. In addition, data subscriptions and a data report to a required target object can be resolved through explicit or implicit indication of the data subscription request message, thereby reducing signaling overheads and avoiding repeated data transmission. In this embodiment of this application, centralized control of a function (that is, a first function) of a core network data plane is supported, that is, data subscription is uniformly managed by the first function, and another data plane function is responsible for receiving and processing a data report. In addition, hierarchical control of data plane functions of a core network, a radio access network, and UE is supported, that is, a data subscription function is jointly managed by the first function, a second function, and/or a third function. For a case in which a plurality of nodes need same data subscription information, signaling overheads are reduced and repeated data transmission is avoided through indication of a data receiver and indication of a transmission path.

To describe the data subscription method provided in the embodiments of this application more clearly, three examples are illustrated below.

EXAMPLE 1

Figure 5:
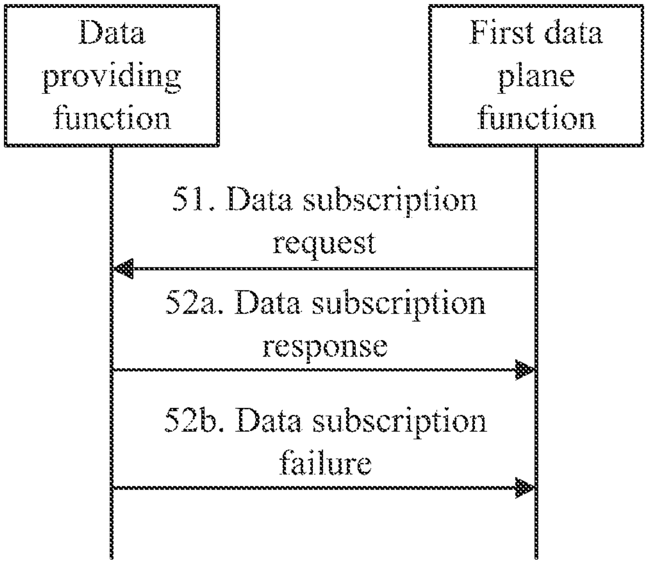
FIG. 5 is a schematic interaction diagram of an example 1 according to an embodiment of this application.

FIG. 5 shows a solution in which a data subscription requester is the same as a receiver of data report, that is, a receiver of data report is a sender of a data subscription request. A first data plane function may be a first function, a second function, or a third function. A data providing function configures a data collection range according to the first function, the second function, or the third function, and the data providing function is one of functions in the data collection range. Related steps are as follows:

Step 51: A first data plane function sends a data subscription request. Preferably, in this example, a receiver of data report and/or a data transmission path are/is implicitly indicated.

Step 52*a*: If a data providing function can accept some or all subscription parameters, send a data subscription response message.

Step 52*b*: If the data providing function denies all subscription parameters, send a data subscription failure message.

EXAMPLE 2

Figure 6:
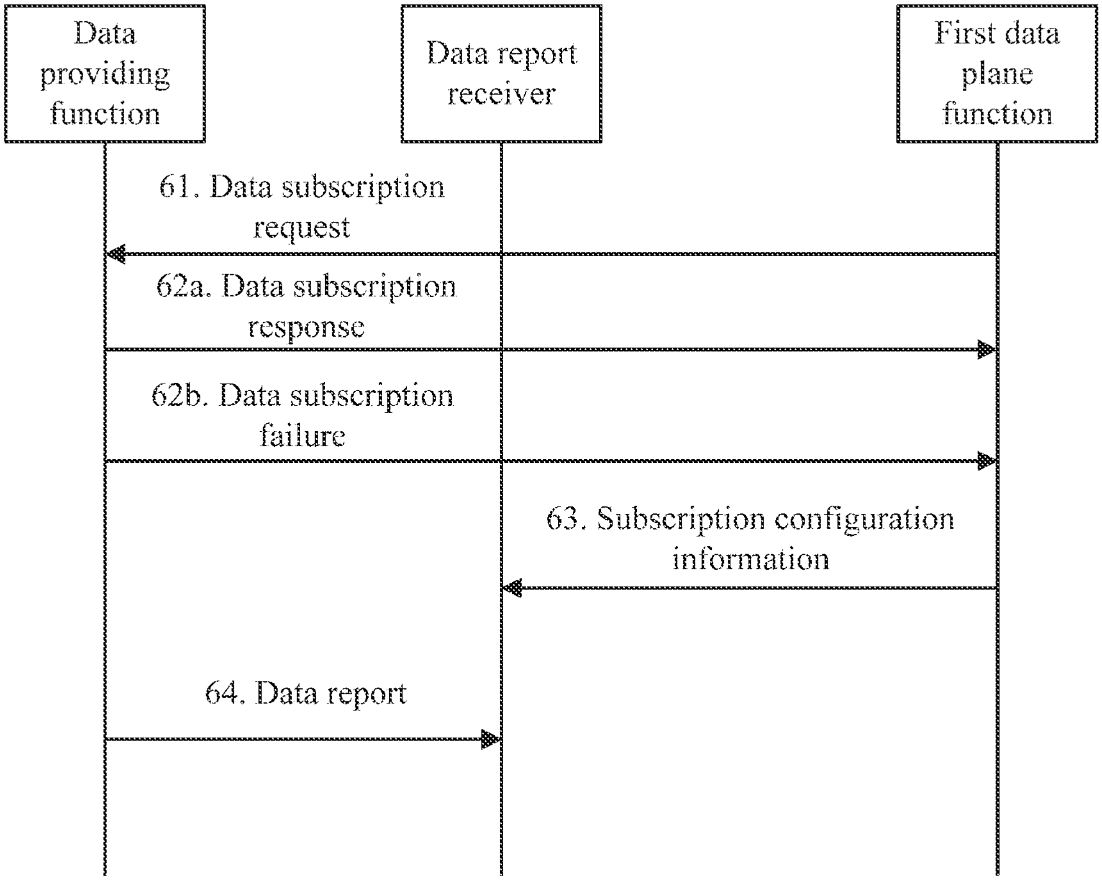
FIG. 6 is a schematic interaction diagram of an example 2 according to an embodiment of this application.

FIG. 6 shows a solution in which a data subscription requester is different from a receiver of data report, and there is one receiver of data report. A first data plane function may be a first function, a second function, or a third function. The receiver of data report may be a second function, a third function, or a data service consumer. A data providing function configures a data collection range according to the first function, the second function, or the third function, and the data providing function is one of functions in the data collection range. Related steps are as follows:

Step 61: A first data plane function sends a data subscription request, where the data subscription request is described in the foregoing technical solution. In this example, a receiver of data report and/or a data transmission path are/is explicitly indicated or in a preset manner.

Step 62*a*: If a data providing function can accept some or all subscription parameters, send a data subscription response message, and perform step 63.

Step 62*b*: If the data providing function denies all subscription parameters, send a data subscription failure message.

Step 63: The first data plane function sends subscription configuration information to indicate related information of a data report that the receiver of data report needs to receive.

Step 64: The data provider sends a data report to the receiver of data report according to accepted data subscription.

EXAMPLE 3

This example is a solution in which a data subscription requester is different from a receiver of data report, and there is more one receiver. Based on example 2, when there is more one receiver, a solution is described as follows, and is generally applicable to a case that data reports received by different receivers are different or reported parameters are less overlapped.

In step 63 of example 2, the first data plane function separately sends subscription configuration information to different receivers.

In step 64 of example 2, the data provider separately send data reports to different receivers.

Based on example 2, when there is more than one receiver, another solution is described as follows, and is generally applicable to a case that data reports received by different receivers are the same or reported parameters overlap a lot.

In step 63 of example 2, the first data plane function separately sends subscription configuration information to different receivers. In addition, the configuration information further needs to include a data report processing instruction, used to indicate processing by the configured receiver of data report on a data report, where the data report is transparently forwarded, and/or the data report is locally processed.

In step 64 of example 2, the data provider reports data to the receiver of data report according to an accepted data subscription request and an indicated transmission path.

In an optional embodiment, when the data providing function is UE and the first data plane function is the foregoing first function, a potential solution of the foregoing data subscription request message may be implemented by extending definition of a non-access stratum NAS message. When the data providing function is UE and the first data plane function is the foregoing second function, one potential solution of the foregoing data subscription request message may be implemented by extending definition of a radio resource control RRC message.

It should be noted that, the data subscription method provided in the embodiments of this application may be performed by a data subscription apparatus, or a control module that is in the data subscription apparatus and that is configured to perform the data subscription method. In the embodiments of this application, an example in which the data subscription apparatus performs the data subscription method is used to describe the data subscription apparatus provided in the embodiments of this application.

Figure 7:
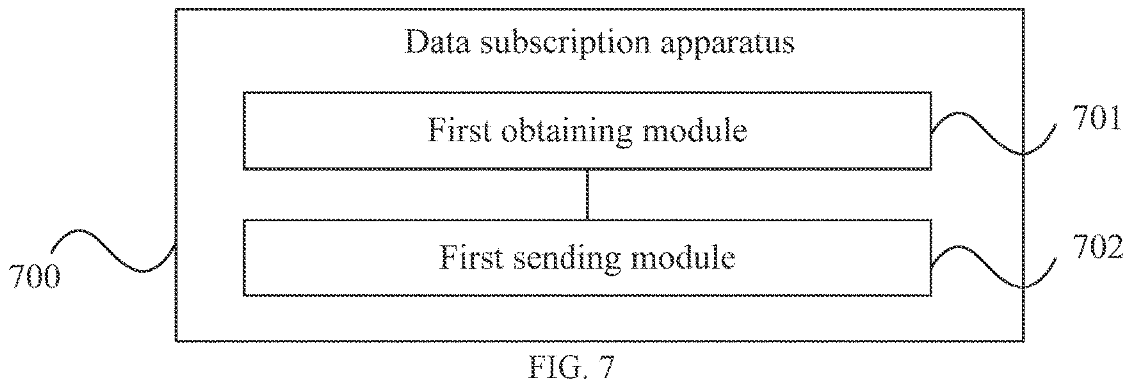
FIG. 7 is a first schematic structural diagram of a data subscription apparatus according to an embodiment of this application.

As shown in FIG. 7, an embodiment of this application further provides a data subscription apparatus 700, applied to a first data plane function and including:

a first acquiring module 701, configured to obtain data service configuration information and/or data service request information; and a first sending module 702, configured to send a data subscription request message to a data providing function according to the data service configuration information and/or the data service request information.

In an optional embodiment, the first data plane function includes at least one of the following:

a first function of a core network data plane;

a second function of a radio access network data plane; or a third function of a terminal side data plane.

In an optional embodiment, the data subscription request message includes at least one of the following:

a message type;

a subscription type;

identifier information of the data subscription request message;

identifier information of the data providing function; or subscription parameter information.

In an optional embodiment, the data subscription request message further includes at least one of the following:

indication information of a receiver of data report;

indication information of a transmission path of data report; or indication information of a reporting manner of a data report.

In an optional embodiment, the data subscription request message is used to implicitly indicate that a receiver of data report is the same as a sender of the data subscription request message;

and/or the data subscription request message is used to implicitly indicate that a transmission path of data report is the same as a transmission path of the data subscription request message.

In an optional embodiment, a receiver of data report is indirectly indicated by using at least one piece of information included in the data subscription request message;

and/or a transmission path of data report is indirectly indicated by using at least one piece of information included in the data subscription request message;

and/or a reporting manner of a data report is indirectly indicated by using at least one piece of information included in the data subscription request message.

In an optional embodiment, the apparatus further includes:

a first receiving module, configured to receive a data subscription response message or a data subscription failure message sent by the data providing function, where the data subscription response message is used to indicate that the data providing function accepts some or all subscription parameters; and the data subscription failure message is used to indicate that the data providing function denies all subscription parameters.

In an optional embodiment, the data subscription response message includes at least one of the following:

a message type;

a subscription type;

identifier information of the data subscription request message;

identifier information of the data providing function; or accepted subscription parameter information.

In an optional embodiment, the data subscription failure message includes at least one of the following:

a message type;

a subscription type;

identifier information of the data subscription request message;

identifier information of the data providing function; or a denial cause.

In an optional embodiment, the apparatus further includes:

a second sending module, configured to send subscription configuration information to at least one receiver of data report, where the subscription configuration information is used to indicate related information of a data report that the receiver of data report needs to receive.

In an optional embodiment, the subscription configuration information includes at least one of the following:

a subscription type;

a subscription identifier of a data report;

identifier information of the data providing function;

subscription parameter information; or indication information of a reporting manner of a data report.

In an optional embodiment, the subscription configuration information further includes:

indication information of data report processing used to indicate a manner of processing a data report by the receiver of data report, where the processing manner includes: transparently forwarding the data report, and/or locally processing the data report.

In an optional embodiment, the subscription parameter information includes at least one of the following:

list information of a subscription parameter;

a sampling rate of a subscription parameter; or trigger condition information of a subscription parameter.

In an optional embodiment, the subscription type includes at least one of the following:

terminal-oriented subscription;

network function-oriented subscription; or service-oriented subscription.

In this embodiment of this application, the first data plane function sends the data subscription request message to the data providing function according to the data service configuration information and/or the data service request information, to implement real-time data subscription. In addition, data subscriptions and a data report to a required target object can be resolved through explicit or implicit indication of the data subscription request message, thereby reducing signaling overheads and avoiding repeated data transmission. In this embodiment of this application, centralized control of a function (that is, a first function) of a core network data plane is supported, that is, data subscription is uniformly managed by the first function, and another data plane function is responsible for receiving and processing a data report. In addition, hierarchical control of data plane functions of a core network, a radio access network, and UE is supported, that is, a data subscription function is jointly managed by the first function, a second function, and/or a third function. For a case in which a plurality of nodes need same data subscription information, signaling overheads are reduced and repeated data transmission is avoided through indication of a data receiver and indication of a transmission path.

It should be noted that the data subscription apparatus provided in this embodiment of this application is an apparatus that can perform the foregoing data subscription method. Therefore, all embodiments of the foregoing data subscription method are applicable to the apparatus, and a same or similar beneficial effect can be achieved.

Figure 8:
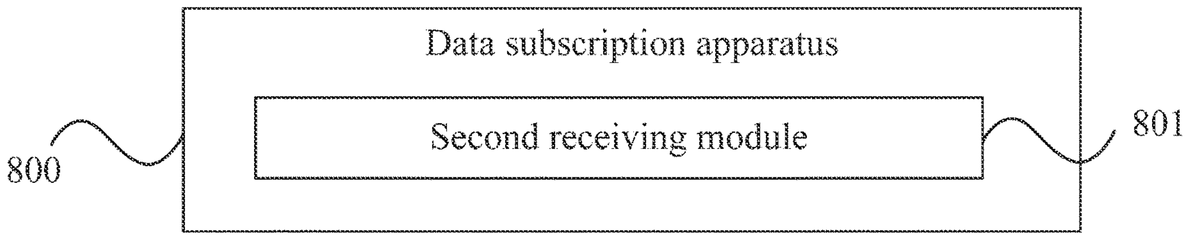
FIG. 8 is a second schematic structural diagram of a data subscription apparatus according to an embodiment of this application.

As shown in FIG. 8, an embodiment of this application further provides a data subscription apparatus 800, applied to a data providing function and including:

a second receiving module 801, configured to receive a data subscription request message sent by a first data plane function according to data service configuration information and/or data service request information.

In an optional embodiment, the first data plane function includes at least one of the following:

a first function of a core network data plane;

a second function of a radio access network data plane; or a third function of a terminal side data plane.

In an optional embodiment, the data subscription request message includes at least one of the following:

a message type;

a subscription type;

identifier information of the data subscription request message;

identifier information of the data providing function; or subscription parameter information.

In an optional embodiment, the data subscription request message further includes at least one of the following:

indication information of a receiver of data report;

indication information of a transmission path of data report; or indication information of a reporting manner of a data report.

In an optional embodiment, the data subscription request message is used to implicitly indicate that a receiver of data report is the same as a sender of the data subscription request message;

and/or the data subscription request message is used to implicitly indicate that a transmission path of data report is the same as a transmission path of the data subscription request message.

In an optional embodiment, a receiver of data report is indirectly indicated by using at least one piece of information included in the data subscription request message;

and/or a transmission path of data report is indirectly indicated by using at least one piece of information included in the data subscription request message;

and/or a reporting manner of a data report is indirectly indicated by using at least one piece of information included in the data subscription request message.

In an optional embodiment, the apparatus further includes:

a second sending module, configured to send a data subscription response message or a data subscription failure message to the first data plane function, where the data subscription response message is used to indicate that the data providing function accepts some or all subscription parameters; and the data subscription failure message is used to indicate that the data providing function denies all subscription parameters.

In an optional embodiment, the data subscription response message includes at least one of the following:

a message type;

a subscription type;

identifier information of the data subscription request message;

identifier information of the data providing function; or accepted subscription parameter information.

In an optional embodiment, the data subscription failure message includes at least one of the following:

a message type;

a subscription type;

identifier information of the data subscription request message;

identifier information of the data providing function; or a denial cause.

In an optional embodiment, the apparatus further includes:

a first determining module, configured to determine at least one receiver of data report according to the data subscription request message; and a third sending module, configured to send a corresponding data report to the at least one receiver of data report.

In an optional embodiment, the subscription parameter information includes at least one of the following:

list information of a subscription parameter;

a sampling rate of a subscription parameter; and trigger condition information of a subscription parameter.

In an optional embodiment, the subscription type includes at least one of the following:

terminal-oriented subscription;

network function-oriented subscription; or service-oriented subscription.

In this embodiment of this application, the first data plane function sends the data subscription request message to the data providing function according to the data service configuration information and/or the data service request information, to implement real-time data subscription. In addition, data subscriptions and a data report to a required target object can be resolved through explicit or implicit indication of the data subscription request message, thereby reducing signaling overheads and avoiding repeated data transmission. In this embodiment of this application, centralized control of a function (that is, a first function) of a core network data plane is supported, that is, data subscription is uniformly managed by the first function, and another data plane function is responsible for receiving and processing a data report. In addition, hierarchical control of data plane functions of a core network, a radio access network, and UE is supported, that is, a data subscription function is jointly managed by the first function, a second function, and/or a third function. For a case in which a plurality of nodes need same data subscription information, signaling overheads are reduced and repeated data transmission is avoided through indication of a data receiver and indication of a transmission path.

It should be noted that the data subscription apparatus provided in this embodiment of this application is an apparatus that can perform the foregoing data subscription method. Therefore, all embodiments of the foregoing data subscription method are applicable to the apparatus, and a same or similar beneficial effect can be achieved.

Figure 9:
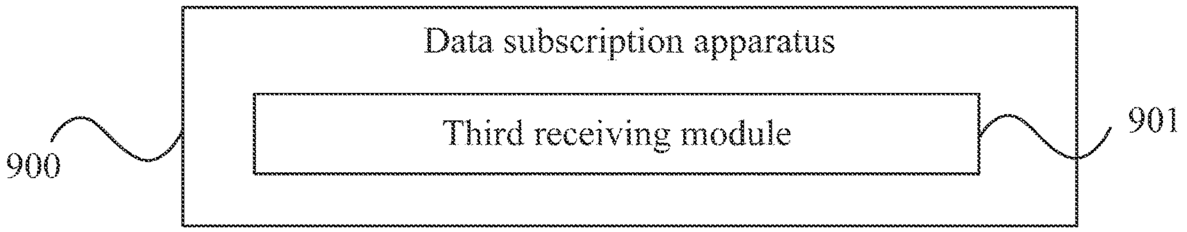
FIG. 9 is a third schematic structural diagram of a data subscription apparatus according to an embodiment of this application.

As shown in FIG. 9, an embodiment of this application further provides a data subscription apparatus 900, applied to a receiver of data report and including:

a third receiving module 901, configured to receive subscription configuration information sent by a first data plane function, where the subscription configuration information is used to indicate related information of a data report that the receiver of data report needs to receive.

In an optional embodiment, the subscription configuration information includes at least one of the following:

a subscription type;

a subscription identifier of a data report;

identifier information of a data providing function;

subscription parameter information; or indication information of a reporting manner of a data report.

In an optional embodiment, the subscription configuration information further includes:

indication information of data report processing used to indicate a manner of processing a data report by the receiver of data report, where the processing manner includes: transparently forwarding the data report, and/or locally processing the data report.

In an optional embodiment, the apparatus further includes:

a fourth receiving module, configured to receive, according to the subscription configuration information, a data report sent by a data providing function.

In an optional embodiment, the first data plane function includes at least one of the following:

a first function of a core network data plane;

a second function of a radio access network data plane; or a third function of a terminal side data plane.

In this embodiment of this application, the first data plane function sends the data subscription request message to the data providing function according to the data service configuration information and/or the data service request information, to implement real-time data subscription. In addition, data subscriptions and a data report to a required target object can be resolved through explicit or implicit indication of the data subscription request message, thereby reducing signaling overheads and avoiding repeated data transmission. In this embodiment of this application, centralized control of a function (that is, a first function) of a core network data plane is supported, that is, data subscription is uniformly managed by the first function, and another data plane function is responsible for receiving and processing a data report. In addition, hierarchical control of data plane functions of a core network, a radio access network, and UE is supported, that is, a data subscription function is jointly managed by the first function, a second function, and/or a third function. For a case in which a plurality of nodes need same data subscription information, signaling overheads are reduced and repeated data transmission is avoided through indication of a data receiver and indication of a transmission path.

It should be noted that the data subscription apparatus provided in this embodiment of this application is an apparatus that can perform the foregoing data subscription method. Therefore, all embodiments of the foregoing data subscription method are applicable to the apparatus, and a same or similar beneficial effect can be achieved.

The data subscription apparatus in this embodiment of this application may be an apparatus, an apparatus or an electronic device with an operating system, or a component, an integrated circuit, or a chip in a terminal. The apparatus or the electronic device may be a mobile terminal or a non-mobile terminal. For example, the mobile terminal may include but is not limited to the foregoing listed types of the terminal 11. The non-mobile terminal may be a server, a network attached storage (NAS), a personal computer (PC), a television (TV), a teller machine, or a self-service machine. This is not specifically limited in this embodiment of this application.

The data subscription apparatus provided in this embodiment of this application can implement the processes implemented in the method embodiments of FIG. 1 to FIG. 6, and achieve a same technical effect. To avoid repetition, details are not described herein again.

Figure 10:
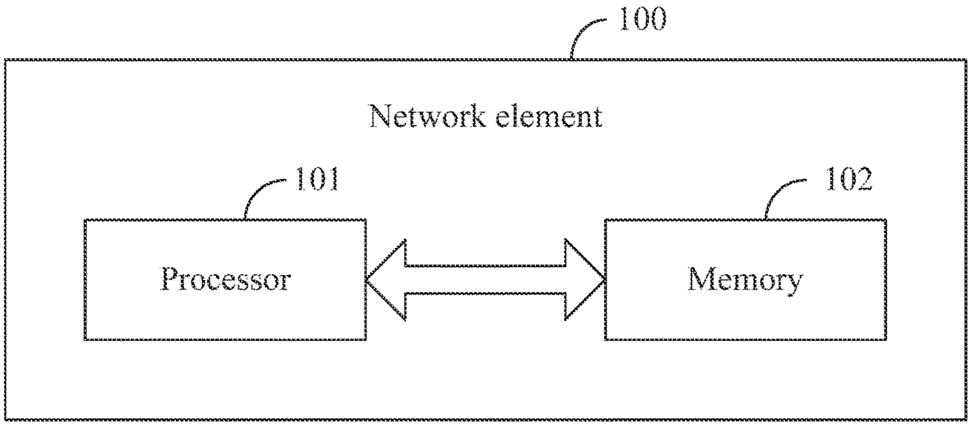
FIG. 10 is a first schematic structural diagram of a network element according to an embodiment of this application.

Optionally, as shown in FIG. 10, an embodiment of this application further provides a network element 100, including a processor 101, a memory 102, and a program or an instruction that is stored in the memory 102 and that can be run on the processor 101. For example, when the network element 100 is a network element having a first data plane function, the program or the instruction is executed by the processor 101 to implement the processes of the foregoing data subscription method embodiment, and a same technical effect can be achieved. When the network element 100 is a network element having a data providing function, the program or the instruction is executed by the processor 101 to implement the processes of the foregoing data subscription method embodiment, and a same technical effect can be achieved. When the network element 100 is a network element corresponding to a receiver of data report, the program or the instruction is executed by the processor 101 to implement the processes of the foregoing data subscription method embodiment, and a same technical effect can be achieved. To avoid repetition, details are not described herein again.

Figure 11:
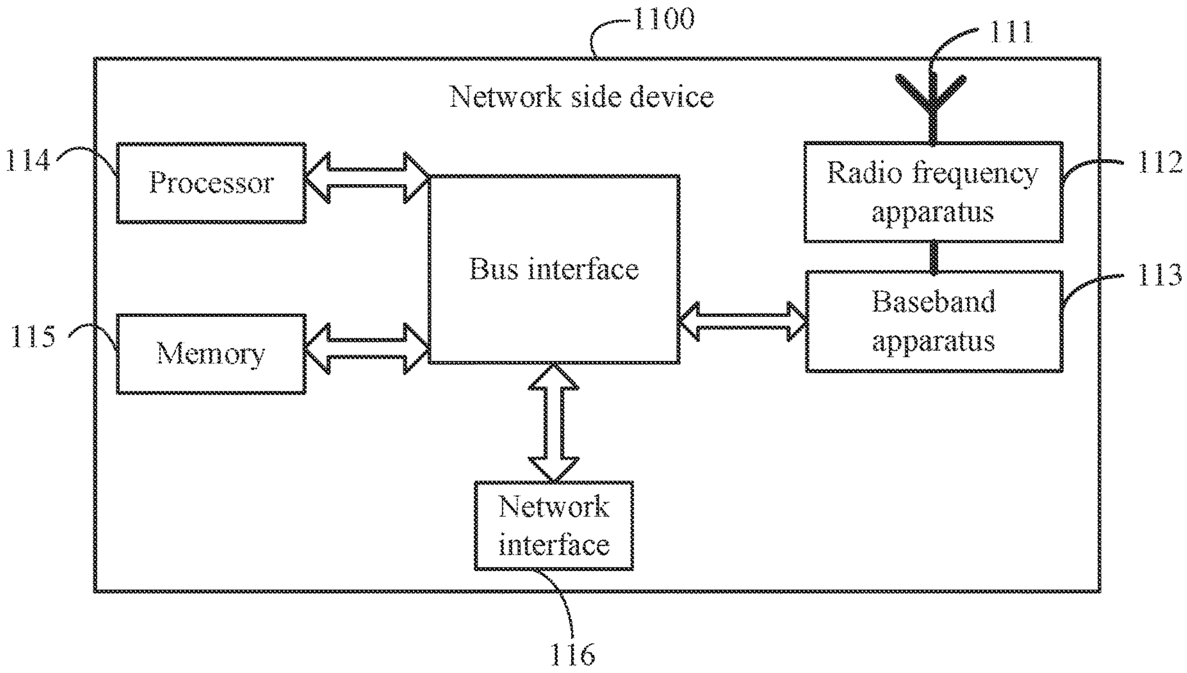
FIG. 11 is a second schematic structural diagram of a network element according to an embodiment of this application.

Specifically, an embodiment of this application further provides a network element. As shown in FIG. 11, a network element 1100 includes an antenna 111, a radio frequency apparatus 112, and a baseband apparatus 113. The antenna 111 is connected to the radio frequency apparatus 112. In an uplink direction, the radio frequency apparatus 112 receives information by using the antenna 111, and sends the received information to the baseband apparatus 113 for processing. In a downlink direction, the baseband apparatus 113 processes information that needs to be sent, and sends processed information to the radio frequency apparatus 112. The radio frequency apparatus 112 processes the received information, and sends processed information by using the antenna 111.

The frequency band processing apparatus may be located in the baseband apparatus 113, and the method performed by the network element in the foregoing embodiment may be implemented in the baseband apparatus 113. The baseband apparatus 113 includes a processor 114 and a memory 115.

The baseband apparatus 113 may include, for example, at least one baseband board, where a plurality of chips are disposed on the baseband board. As shown in FIG. 11, one chip is, for example, the processor 114, which is connected to the memory 115, so as to schedule a program in the memory 115 to perform an operation of the network element shown in the foregoing method embodiment.

The baseband apparatus 113 may further include a network interface 116, configured to exchange information with the radio frequency apparatus 112. For example, the interface is a common public radio interface (CPRI).

Specifically, the network element in this embodiment of the present invention further includes an instruction or a program that is stored in the memory 115 and that can be run on the processor 114. The processor 114 invokes the instruction or the program in the memory 115 to perform the method performed by the modules shown in FIG. 7, FIG. 8, and FIG. 9, and a same technical effect is achieved. To avoid repetition, details are not described herein again.

An embodiment of this application further provides a readable storage medium. The readable storage medium stores a program or an instruction, and the program or the instruction is executed by a processor to implement the processes in the foregoing data subscription method embodiment, and a same technical effect can be achieved. To avoid repetition, details are not described herein again.

The processor is a processor in the terminal in the foregoing embodiment. The readable storage medium includes a computer readable storage medium, for example, a read-only memory (ROM), a random access memory (RAM), a magnetic disk, or an optical disc.

An embodiment of this application further provides a chip. The chip includes a processor and a communication interface, the communication interface is coupled to the processor, and the processor is configured to run a program or an instruction to implement the processes of the foregoing data subscription method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

An embodiment of this application further provides a computer program/program product. The computer program/program product is stored in a non-transient storage medium, and the program/program product is executed by at least one processor to implement the processes of the foregoing method embodiment, and a same technical effect can be achieved. To avoid repetition, details are not described herein again.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of this application essentially or the part contributing to the prior art may be implemented in a form of a computer software product. The computer software product is stored in a storage medium (for example, a ROM/RAM, a floppy disk, or an optical disc), and includes several instructions for instructing a terminal (which may be a mobile phone, a computer, a server, an air conditioner, a network device, or the like) to perform the methods described in the embodiments of this application.

The embodiments of this application are described above with reference to the accompanying drawings, but this application is not limited to the above specific implementations, and the above specific implementations are merely illustrative but not restrictive. Under the enlightenment of this application, a person of ordinary skill in the art can make many forms without departing from the purpose of this application and the protection scope of the claims, all of which fall within the protection of this application.

The invention claimed is:

1. A data subscription method, comprising:

obtaining, by a first data plane function, data service configuration information and/or data service request information; and sending, by the first data plane function, a data subscription request message to a data providing function according to the data service configuration information and/or the data service request information, wherein the first data plane function comprises at least one of the following:

a first function of a core network data plane;

a second function of a radio access network data plane; or a third function of a terminal side data plane.

2. The method according to claim 1, wherein the data subscription request message comprises at least one of the following:

a message type;

a subscription type;

identifier information of the data subscription request message;

identifier information of the data providing function; or subscription parameter information.

3. The method according to claim 1, wherein the data subscription request message further comprises at least one of the following:

indication information of a receiver of data report;

indication information of a transmission path of data report; or indication information of a reporting manner of a data report;

or, wherein the data subscription request message is used to implicitly indicate that a receiver of data report is the same as a sender of the data subscription request message;

and/or the data subscription request message is used to implicitly indicate that a transmission path of data report is the same as a transmission path of the data subscription request message;

or, wherein a receiver of data report is indirectly indicated by using at least one piece of information comprised in the data subscription request message;

and/or a transmission path of data report is indirectly indicated by using at least one piece of information comprised in the data subscription request message;

and/or a reporting manner of a data report is indirectly indicated by using at least one piece of information comprised in the data subscription request message.

4. The method according to claim 1, wherein the method further comprises:

receiving, by the first data plane function, a data subscription response message or a data subscription failure message sent by the data providing function, wherein the data subscription response message is used to indicate that the data providing function accepts some or all subscription parameters; and the data subscription failure message is used to indicate that the data providing function denies all subscription parameters.

5. The method according to claim 4, wherein the data subscription response message comprises at least one of the following:

a message type;

a subscription type;

identifier information of the data subscription request message;

identifier information of the data providing function; or accepted subscription parameter information;

or, wherein the data subscription failure message comprises at least one of the following:

a message type;

a subscription type;

identifier information of the data subscription request message;

identifier information of the data providing function; or a denial cause.

6. The method according to claim 4, wherein after the receiving, by the first data plane function, a data subscription response message, the method further comprises:

separately sending, by the first data plane function, subscription configuration information to at least one receiver of data report, wherein the subscription configuration information is used to indicate related information of a data report that the receiver of data report needs to receive.

7. The method according to claim 6, wherein the subscription configuration information comprises at least one of the following:

a subscription type;

a subscription identifier of a data report;

identifier information of the data providing function;

subscription parameter information; or indication information of a reporting manner of a data report.

8. The method according to claim 7, wherein the subscription configuration information further comprises:

indication information of data report processing used to indicate a manner of processing a data report by the receiver of data report, wherein the processing manner comprises: transparently forwarding the data report, and/or locally processing the data report.

9. The method according to claim 7, wherein the subscription parameter information comprises at least one of the following:

list information of a subscription parameter;

a sampling rate of a subscription parameter; or trigger condition information of a subscription parameter;

or, wherein the subscription type comprises at least one of the following:

terminal-oriented subscription;

network function-oriented subscription; or service-oriented subscription.

10. A data subscription method, comprising:

receiving, by a data providing function, a data subscription request message sent by a first data plane function according to data service configuration information and/or data service request information, wherein the first data plane function comprises at least one of the following:

a first function of a core network data plane;

a second function of a radio access network data plane; or a third function of a terminal side data plane.

11. The method according to claim 10, wherein the method further comprises:

sending, by the data providing function, a data subscription response message or a data subscription failure message to the first data plane function, wherein the data subscription response message is used to indicate that the data providing function accepts some or all subscription parameters; and the data subscription failure message is used to indicate that the data providing function denies all subscription parameters.

12. The method according to claim 11, wherein after the sending, by the data providing function, a data subscription response message to the first data plane function, the method further comprises:

determining, by the data providing function, at least one receiver of data report according to the data subscription request message; and sending, by the data providing function, a corresponding data report to the at least one receiver of data report.

13. A data subscription method, comprising:

receiving, by a receiver of data report, subscription configuration information sent by a first data plane function, wherein the subscription configuration information is used to indicate related information of a data report that the receiver of data report needs to receive, wherein the first data plane function comprises at least one of the following:

a first function of a core network data plane;

a second function of a radio access network data plane; or a third function of a terminal side data plane.

14. The method according to claim 13, wherein the subscription configuration information comprises at least one of the following:

a subscription type;

a subscription identifier of a data report;

identifier information of a data providing function;

subscription parameter information; or indication information of a reporting manner of a data report.

15. The method according to claim 14, wherein the subscription configuration information further comprises:

indication information of data report processing used to indicate a manner of processing a data report by the receiver of data report, wherein the processing manner comprises: transparently forwarding the data report, and/or locally processing the data report.

16. The method according to claim 13, wherein the method further comprises:

receiving, according to the subscription configuration information, a data report sent by a data providing function.

17. A network element having a first data plane function, comprising a processor, a memory, and a program or an instruction that is stored in the memory and that can be run on the processor, wherein the program or the instruction is executed by the processor to implement the steps of the data subscription method according to claim 1.

18. A network element having a data providing function, comprising a processor, a memory, and a program or an instruction that is stored in the memory and that can be run on the processor, wherein the program or the instruction is executed by the processor to implement the steps of the data subscription method according to claim 10.

19. A network element corresponding to a receiver of data report, comprising a processor, a memory, and a program or an instruction that is stored in the memory and that can be run on the processor, wherein the program or the instruction is executed by the processor to implement the steps of the data subscription method according to claim 13.

* * * * *